Aug. 18, 1953     M. LANG     2,649,491
DRY CELL
Filed March 2, 1950
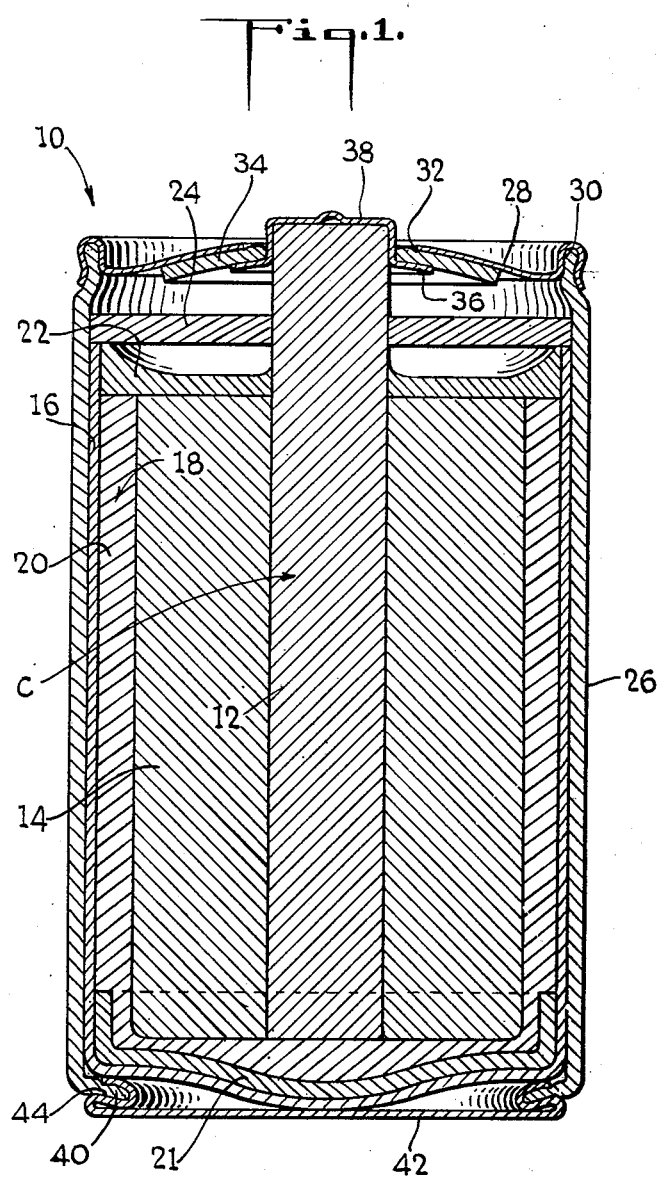
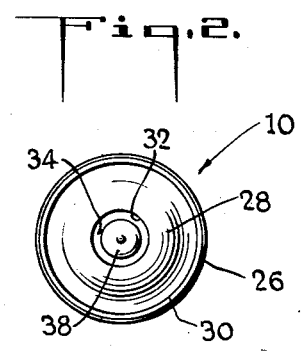
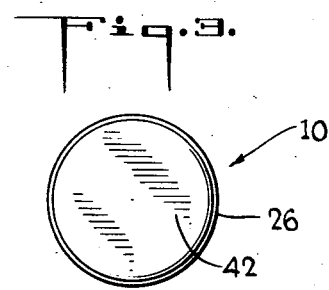
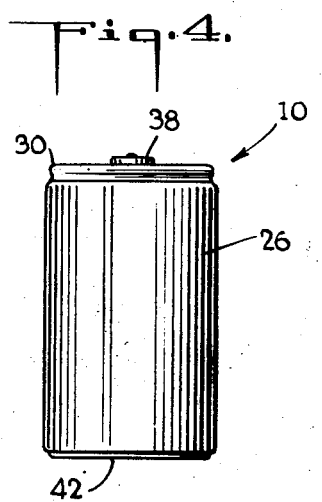
INVENTOR.
MAURICE LANG
BY
ATTORNEY Patented Aug. 18, 1953

2,649,491

UNITED STATES PATENT OFFICE 2,649,491

DRY CELL

Maurice Lang, Long Beach, N. Y., assignor to
Henry Hyman, New York, N. Y.

Application March 2, 1950, Serial No. 147,195

10 Claims. (Cl. 136—95)

This invention relates to dry cells of the type used in flashlights and the like, i. e. to cells having paste electrolyte. More particularly, the invention pertains to an improved leak resistant dry cell.

By way of example, the present invention will be described herein with respect to a standard Leclanché dry cell. It is to be understood, however, that this specific form of the invention is only to be considered as illustrative, and the present invention is not to be deemed as limited thereby except to the extent to which features of such embodiment are pointed out below and are incorporated in the appended claims.

A typical Leclanché dry cell comprises a cathode constituting a manganese dioxide bobbin within which a carbon rod is embedded. The cathode is disposed in a zinc cup anode, and a paste electrolyte is located therebetween. The top of the cell is closed by a seal between the anode and cathode.

A dry cell is subject to swelling when drained too extensively; and the pressure developed within the cell and perforation of the cup anode tend to make the cell leak. Swelling and leakage are extremely undesirable since they cause the cell to stick in its container, e. g. the flashlight casing, and subject the container to chemical attack. Swelling and leakage usually will ruin a flashlight or other object in which a dry cell is disposed.

To minimize or prevent swelling and leakage, it has been proposed to enclose the cell in an impermeable covering including positive and negative terminals. Said covering serves to keep decomposition products away from the flashlight casing or the like container which houses the cell.

One such type of covering employs a jacket of an electrically non-conductive material. This type of covering conventionally includes top and bottom metallic elements which are joined to the jacket in a leak-resistant manner and serve as terminals. To improve this type of covering is the principal object of the present invention.

A major disadvantage of this covering is that the bottom portion of the zinc cup may be entirely consumed in the electrochemical cell reaction, and if this occurs the bottom metallic terminal becomes the anode of the cell and is subjected to electrolytic corrosion. Continued electrochemical attack will perforate this substituted anode and allow leakage. In addition to being corroded, the terminal permits the electrochemical reactions of the cell to continue and swelling to increase. The cell may begin to leak at various weak points when the internal pressure rises too high because of the continued reactions; but, when the bottom terminal is broken through, effluence of decomposition products becomes certain.

It is the principal object of the present invention to provide a dry cell of the character described having improved leak resistant qualities.

It is another object of the invention to provide a dry cell of the character described in which swelling stops at a certain point of exhaustion.

Still another object of the invention is to provide a dry cell of the character described which cannot leak through its bottom.

A further object of the invention is to provide a leak resistant dry cell which is inexpensive and simple to manufacture.

An ancillary object of the invention is to provide a dry cell of the character described having an improved top closure.

Other objects of the invention will in part be obvious and in part will be pointed out hereinafter.

The invention accordingly consists in the features of construction, combination of elements and arrangements of parts which will be exemplified in the dry cell hereinafter described and of which the scope of application will be indicated in the appended claims.

In the accompanying drawings in which is shown one of the various possible embodiments of the invention:

Fig. 1 is a longitudinal sectional view through a Leclanché dry cell embodying the present invention, and Figs. 2, 3 and 4 are top, bottom, and side views, respectively, of said cell.

Referring now in detail to the drawings, the reference numeral 10 denotes a dry cell constructed in accordance with the present invention. Said cell comprises a cathode C consisting of a carbon rod 12 embedded in a bobbin 14 composed of a paste including manganese dioxdie and carbon particles. It is believed that the manganese dioxide constitutes the electropositive element of the electrochemical couple and that the carbon rod serves simply as a collector or cell terminal.

A zinc cup 16 comprises the anode, and the space 18 between the bobbin and zinc cup is filled with a paste electrolyte 20 composed for example of water, ammonium chloride, zinc chloride, and cereal.

A wax impregnated paper washer 21 is received at the bottom of the zinc cup. The top of the zinc cup is closed by a soft seal 22, e. g. a wax seal, which runs from the rim of the zinc cup to the carbon rod. Said seal is covered by a paper washer 24, the peripheral edge of which is supported on the zinc cup and which is formed with a central opening to pass the carbon rod.

The zinc cup is nestably received in a jacket 26 of electrically non-conductive material, e. g. pasteboard, which extends from adjacent the bottom to above the top of the cup. A protective sheet metal disc 28 has its rim formed into an annular channel 30 within which the inset upper edge of the jacket is received and held by crimping to form a leak resistant joint. The outer radius of the channel 30 is less than that of the jacket; thereby preventing accidental shunting of the switch in a flashlight or the like through said disc.

The metal disc 28 is provided with a large central aperture 32, the surrounding margin of said disc being seated on a paper washer 34 which rests on and insulates the disc from an outwardly extending base flange 36 of an inverted metal cup 38 that constitutes the conventional top terminal of the cell. Said cup receives the tip of the carbon rod. The diameter of the flange is at least equal to, and preferably larger than, the diameter of the aperture in the disc 28. The washer 34 is under compression between the disc and flange 36 so that a leak-proof joint is produced between the top terminal and the protective disc.

At the base of the cell, the jacket has an integral inwardly directed flange 40 which serves as a support for a bottom (negative) terminal. This terminal constitutes an electrically conductive element, e. g. a sheet metal plate 42, which forms a bottom closure for the jacket. The peripheral edge of said plate is formed with an annular outwardly facing channel 44 which accommodates the flange 40 and is clenched thereon as a leak resistant joint. The overall diameter of said terminal is less than that of the jacket. The bottom of the zinc cup anode engages the upper wall of said annular channel thus establishing the necessary contact between the terminal and the zinc cup. In addition, the base of the zinc cup may be bellied out to touch the top of the plate. If desired, the upper wall of the channel 44 may be shaped to include at the bottom of the cell a short upwardly extending flange disposed between the jacket 26 and the anode, so as to prvide a thin annular space between the jacket and anode into which the zinc cup may expand before swelling is stopped, as now will be described.

Heretofore, metal bottom terminals, conventionally fabricated from metal such as zinc or tin-plated steel, were subject to electrolytic corrosion because they become the anodes when contacted by the electrolyte after the zinc bottom was used up. In the present invention this difficulty is eliminated by fabricating the bottom terminal 42 of a metal which is electropositive with respect to the cathode of the cell at the time that said terminal first begins to take part in the electrochemical reaction of the cell. This theoretically occurs when all the zinc in contact with the terminal is used up. The terminal 42 may be fabricated wholly of such a metal or simply coated with the same on the top or on both sides. Suitable metals are copper and silver.

A bottom terminal such as just described will not be subject at all to electrolytic corrosion. The reason for this is that there is a reversal of polarity within the cell with the bottom terminal becoming the cathode, i. e. the positive terminal. As such, said bottom terminal is not subject to electrolytic corrosion. Since the polarity of the cell is reversed when the zinc is used up, the normal cell reaction ceases even if the cell still is being drained, and the reaction products of the new cell reaction, i. e. with the bottom terminal functioning as a cathode, are of negligible bulk, since at this point further swelling is halted. Thus, no leakage will occur through the bottom, because the swelling of the cell has stopped and because the bottom terminal will not be attacked.

It is to be noted that the electro-potential of the normal cell cathode falls as the cell is used. The material of the bottom terminal is not required to be electropositive with respect to the cell cathode when the cell is fresh, although it may be. The essential factor is that the selected material shall occupy such a position in the electromotive series that it is electropositive with respect to the cell cathode at the time that the bottom terminal begins to take part in the electrochemical action of the cell. In other words, it is possible tto use a metal which is not electroposoitive with respect to the cathode when the cell first is used, but which is electropositive at the proper time because of the degeneration and consequent drop in electropotential of the cell cathode C. This will occur with such metals as have normal electrode potential of +0.3 volt or greater, e. g. copper and silver.

It thus will be seen that there has been provided a device which achieves all the objects of the invention and is well adapted to meet the conditions of practical use.

As various possible embodiments might be made in the above invention, and as various changes might be made in the embodiment above set forth, it is to be understood that all matter herein described, or shown in the accompanying drawings, is to be interpreted as illustrative and not in a limiting sense.

Having thus described the invention, there is claimed as new and desired to secure by Letters Patent:

1. In combination in a dry cell, a negative container electrode, a positive electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, said terminal being composed of a metal which is electropositive with respect to the second named electrode when upon at least partial consumption of the container electrode effluent electrolyte contacts said terminal and when the latter becomes an active electrode in the electrochemical reaction of the cell.

2. In combination in a dry cell, a negative container electrode, a positive electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, the inner surface of said terminal being composed of a metal which is electropositive with respect to the second named electrode when upon at least partial consumption of the container electrode effluent electrolyte contacts said terminal and when the latter becomes an active electrode in the electrochemical reaction of the cell.

3. In combination in a Leclanché dry cell, a zinc container electrode, a manganese dioxide-carbon electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, said terminal being composed of copper, whereby said terminal is electropositive with respect to the second named electrode when upon at least partial consumption of the container electrode effluent electrolyte contacts said terminal and when the latter becomes an active electrode in the electrochemical reaction of the cell.

4. In combination in a Leclanché dry cell, a zinc container electrode, a manganese dioxide-carbon electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, the inner surface of said terminal being composed of copper, whereby said terminal is electropositive with respect to the second named electrode when upon at least partial consumption of the container electrode effluent electrolyte contacts said terminal and when the latter becomes an active electrode in the electrochemical reaction of the cell.

5. In combination in a dry cell, a negative container electrode, a positive electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, said terminal being coated with a metal which is electropositive with respect to the second named electrode when upon at least partial consumption of the container electrode effluent electrolyte contacts said terminal and when the latter becomes an active electrode in the electrochemical reaction of the cell.

6. In combination in a Leclanché dry cell, a zinc container electrode, a manganese dioxide-carbon electrode within and spaced from said container electrode, a paste electrolyte between said electrodes, and a protective covering for said container electrode, said covering including a jacket of electrically non-conductive material wherein the container electrode is disposed and an electrically conductive terminal supported by the jacket and attached thereto by a leak resistant joint, and in contact with the external surface of the container electrode, said terminal being coated with copper, whereby said terminal is electropositive with respect to the second named electrode when upon at least partial consumption of the container electrode effluent electrolyte contacts said terminal and when the latter becomes an active electrode in the electrochemical reaction of the cell.

7. In combination in a dry cell, a negative container electrode, a positive electrode within and spaced from said container electrode, a paste electrolyte between said electrodes, and a protective covering for said container electrode, said covering including a jacket of electrically non-conductive material wherein the container electrode is disposed, said jacket being open at both ends, and electrically conductive closures attached to the top and bottom of said jacket and forming top and bottom leakproof joints therewith, said bottom closure serving as a terminal and being in contact with the external surface of the container electrode, said bottom closure being composed of a metal which is electropositive with respect to the second named electrode when upon at least partial consumption of the container electrode effluent electrolyte contacts said bottom closure and when the latter becomes an active electrode in the electrochemical reaction of the cell.

8. A top closure for use in a dry cell comprising a negative container electrode, a positive electrode within and spaced from said container electrode and a protective covering for said container electrode, said covering including a jacket of electrically non-conductive material wherein the container electrode is disposed, said jacket being open at the top; said top closure comprising a circular sheet metal disc with a central hole, a fibrous non-conductive washer whose outer diameter exceeds that of the hole in the disc, a metal cup with a peripheral flange whose outer diameter exceeds that of the opening in the washer, the outer peripheral edge of said disc having a portion crimped on the upper rim of said jacket, the inner peripheral edge of said disc resting on the top surface of said washer, the bottom surface of said washer resting on the top surface of said washer, the bottom surface of said washer resting on the top surface of the flange of said metal cup, said circular disc, washer, and cup having coincident axes of symmetry, the washer being under compression between said disc and cup, said cup being disposed on top of the positive electrode, the crimped edge of the circular disc having a diameter less than the external diameter of the jacket.

9. In a covering for a dry cell comprising a negative container electrode and a positive electrode within and spaced from said container electrode: a jacket for said container electrode, the wall of said jacket extending above the container electrode, said jacket being open on top, and an electrically conductive closure for said jacket, said closure being attached to the jacket above and out of contact with the container electrode, said top closure comprising a circular sheet metal disc with a central hole, a fibrous non-conductive washer whose outer diameter exceeds that of the hole in the disc, a metal cup with a peripheral flange whose outer diameter exceeds that of the opening in the washer, the outer peripheral edge of said disc having a portion crimped on the upper rim of said jacket, the inner peripheral edge of said disc resting on the top surface of said washer, the bottom surface of said washer resting on the top surface of the flange of said metal cup, said circular disc, washer, and cup having coincident axes of symmetry, the washer being under compression between said disc and cup, said cup being disposed on top of the positive electrode.

10. A top closure for use in a dry cell comprising a negative container electrode, a positive electrode within and spaced from said container electrode and a protective covering for said container electrode, said covering including a jacket of electrically non-conductive material wherein the container electrode is disposed, said jacket being open at the top; said top closure comprising a circular sheet metal disc with a central hole, a fibrous non-conductive washer whose outer diameter exceeds that of the hole in the disc, a metal cup with a peripheral flange whose outer diameter exceeds that of the opening in the washer, the outer peripheral edge of said disc being attached to the upper rim of said jacket, the inner peripheral edge of said disc resting on the top surface of said washer, the bottom surface of said washer resting on the top surface of the flange of said metal cup, said circular disc, washer, and cup having coincident axes of symmetry, the washer being under compression between said disc and cup, said cup being disposed on top of the positive electrode.

MAURICE LANG.

References Cited in the file of this patent

UNITED STATES PATENTS

| Number | Name | Date |
|---|---|---|
| 1,856,386 | Heise | May 3, 1932 |
| 2,332,456 | McEachron et al. | Oct. 19, 1943 |
| 2,392,795 | Anthony et al. | Jan. 8, 1946 |
| 2,396,693 | Glover | Mar. 19, 1946 |
| 2,399,089 | Anthony | Apr. 23, 1946 |
| 2,410,826 | Lang et al. | Nov. 12, 1946 |
| 2,491,879 | Teague | Dec. 20, 1949 |
| 2,539,873 | Steinhoff | Jan. 30, 1951 |

OTHER REFERENCES

The Theoretical Power Output of Storage Batteries by National Battery Co., 1947, page 4.